United States Patent
Lee et al.

(10) Patent No.: US 8,510,774 B2
(45) Date of Patent: Aug. 13, 2013

(54) METHOD, DVD-H SYSTEM AND TERMINAL FOR PROVIDING A BROADCAST IMAGE USING LASER CONTENT

(75) Inventors: Byoung-Dai Lee, Seongnam-si (KR); Young-Jip Kim, Suwon-si (KR); Joon-Ho Park, Suwon-si (KR); Chang-Hyun Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1612 days.

(21) Appl. No.: 12/014,310

(22) Filed: Jan. 15, 2008

(65) Prior Publication Data

US 2008/0172694 A1 Jul. 17, 2008

(30) Foreign Application Priority Data

Jan. 16, 2007 (KR) .................. 10-2007-0004761

(51) Int. Cl.
*H04N 7/025* (2006.01)
(52) U.S. Cl.
USPC .............................. 725/37; 725/40
(58) Field of Classification Search
None
See application file for complete search history.

(56) References Cited

U.S. PATENT DOCUMENTS

| | | | |
|---|---|---|---|
| 2006/0053450 A1* | 3/2006 | Saarikivi et al. | 725/46 |
| 2007/0100984 A1* | 5/2007 | Jansky et al. | 709/223 |
| 2007/0107018 A1* | 5/2007 | Song et al. | 725/69 |

FOREIGN PATENT DOCUMENTS

| | | |
|---|---|---|
| KR | 1020020031457 | 5/2002 |
| KR | 1020060032944 | 4/2006 |
| KR | 1020060053269 | 5/2006 |
| KR | 1020060065060 | 6/2006 |

OTHER PUBLICATIONS

Renaud Cazoulat et al., On the Usage of LASER Video for Mobile Broadcast, ISO/IEC JTC1/SC29/WG11, Coding of Moving Pictures and Audio, Apr. 29, 2005.
DVB Organization: "Rich Media Broadcast, First Ideas on Possible Next Steps for CMBS", Streamezzo, The Rich Media Experience for Mobiles, Nov. 28, 2005.
Systems, "MPEG-4 LASeR White Paper", ISO/IEC JTC 1/SC 29/WG11, N7507, Coding of Moving Pictures and Audio, Jul. 30, 2005.
DVB Organization: "ESG Implementation Guidelines", Draft ETSI TR 1XX XXX V0.0.14, Nov. 2006.

* cited by examiner

*Primary Examiner* — Brian Pendleton
*Assistant Examiner* — Olugbenga Idowu
(74) *Attorney, Agent, or Firm* — The Farrell Law Firm, P.C.

(57) ABSTRACT

A terminal can acquire information required for an image configuration by accessing actual Electronic Service Guide (ESG) information using linking information when broadcast providers transmit Lightweight Application Scene Representation (LASeR) content including the linking information related to the LASeR content and the ESG information provided in a Digital Video Broadcasting-Handheld (DVB-H) Convergence of Broadcast and Mobile Services (CBMS), Open Mobile Alliance Broadcasting (OMA-BCAST) or Open Air Interface (OAI) standard. The broadcast providers can directly control a configuration of a broadcast image to be displayed on the terminal, such that differentiated broadcast images can be provided on a broadcast provider-by-broadcast provider basis.

10 Claims, 6 Drawing Sheets

```
<define name='text'>
<element name='text'>
<ref name='text.AT'/>
<zeroOrMore><ref name='svg.TextCommon.group'/></zeroOrMore>
</element>
</define>
<define name='text.AT' combine='interleave'>
<ref name='svg.Properties.attr'/>
<ref name='svg.Core.attr'/>
<ref name='svg.Conditional.attr'/>
<ref name='svg.FocusHighlight.attr'/>
<ref name='svg.Editable.attr'/>
<ref name='svg.Focus.attr'/>
<ref name='svg.Transform.attr'/>
<ref name='XlinkEmbed.attr'/>                ~400
<optional>
<attribute name='x' svg:animatable='true' svg:inheritable='false'>
<ref name='Coordinates.datatype'/>
</attribute>
</optional>
        :
        :
<text/>
<element name='switch'>
<ref name='switch.AT'/>
<zeroOrMore><ref name='svg.TextCommon.group'/></zeroOrMore>
</element>
<element name='a'>
<ref name='a.AT'/>
<zeroOrMore><ref name='svg.TextCommon-noA.group'/></zeroOrMore>
</element>
</choice>
</define>
```

FIG.4

METHOD, DVD-H SYSTEM AND TERMINAL FOR PROVIDING A BROADCAST IMAGE USING LASER CONTENT

PRIORITY

This application claims priority under 35 U.S.C. §119(a) to a Korean Patent Application filed in the Korean Intellectual Property Office on Jan. 16, 2007 and assigned Serial No. 2007-04761, the entire disclosure of which is hereby incorporated by reference.

BACKGROUND OF THE INVENTION

1. Field of the Invention

The present invention generally relates to Digital Video Broadcasting-Handheld (DVB-H), and more particularly to a method and system that can easily provide a DVB-H terminal with configuration information of a broadcast image, and the DVB-H terminal therefor.

2. Description of the Related Art

Mobile broadcast technology is being recognized as a must-have application of next-generation mobile terminals. Various mobile broadcast standardizations have been and continue to be developed, and mobile broadcast services are already being provided. Examples of mobile broadcast standards are Digital Video Broadcasting-Handheld (DVB-H), Terrestrial-Digital Multimedia Broadcasting (T-DMB), MediaFLO, and the like. In DVB-H, a DVB-H terminal configures an image of a DVB-H broadcast service after first receiving and processing meta-information required for receiving an actual video/audio stream from a broadcast server, thereby providing a user with a multimedia broadcast service.

The meta-information includes not only actual broadcast reception information, but also detailed information regarding an associated service for the user. For example, in DVB-H, the meta-information is a specific service name, genre, service time, and the like. The meta-information is defined in a DVB-H Convergence of Broadcast and Mobile Services (CBMS) standard. The DVB-H terminal receives the meta-information, stores the received meta-information in an internal storage device, and displays the stored meta-information to the user via a unique Graphical User Interface (GUI). The user selects services using the GUI. However, the meta-information does not include information regarding how to actually display broadcast information on the DVB-H terminal.

Although a broadcast provider can control the meta-information, a scheme for actually configuring and displaying the meta-information in the DVB-H terminal is wholly determined by a GUI application program of the DVB-H terminal rather than the broadcast provider.

A multimedia broadcast includes channels or content of various genres such as news, sports, shopping, drama, movie, music, documentary, and the like. Various images should be configured on the basis of channel or content characteristics. Active research is being conducted on multimedia scene configuration standards for mobile terminals as well as mobile broadcast standards. For example, the multimedia scene configuration standards are a Binary Format for Scene (BIFS) standard and a Lightweight Application Scene Representation (LASeR) standard. These standards describe how to actually configure multimedia objects such as graphics and events with video/audio in an image and the relationship between objects and user inputs. However, the existing DVB-H technology only provides a broadcast image using a specific image configuration scheme pre-implemented within the terminal, but may not provide linking information related to an image configuration standard.

There exist limitations in displaying various types of multimedia broadcast services without a special upgrade process for software for displaying a multimedia broadcast implemented in the DVB-H terminal although multimedia broadcast formats continuously develop and change.

SUMMARY OF THE INVENTION

As described above, Digital Video Broadcasting-Handheld (DVB-H) terminals may equally process a type of received information, a transmission format, and the like. However, actual information display methods differ according to application programs running in the DVB-H terminals. In addition, the DVB-H terminal needs to configure various images according to characteristics of a channel or content for providing a multimedia broadcast. In the current standard structure, a collective image configuration scheme applied to the DVB-H terminals, but a method for variously changing an image is not provided. In addition, a method for providing unique image configuration schemes on a broadcast provider-by-broadcast provider basis is not provided. This is a very important structural problem and is an obstacle to function extension of a DVB-H reception terminal.

An aspect of the exemplary embodiments of the present invention is to address at least the above problems and/or disadvantages and to provide at least the advantages described below. Accordingly, an aspect of the exemplary embodiments of the present invention is to provide a method that can easily control a broadcast image configuration using Lightweight Application Scene Representation (LASeR) content, and a system and a DVB-H terminal therefor.

An aspect of the exemplary embodiments of the present invention is to provide a method that can provide broadcast image configuration information through linking information between LASeR content and Electronic Service Guide (ESG) information, and a system and a DVB-H terminal therefor.

In accordance with an aspect of the exemplary embodiments of the present invention, there is provided a method for providing a broadcast image using LASeR content in a DVB-H terminal that includes acquiring Scalable Vector Graphics Tiny (SVGT) content by decoding a LASeR binary stream received from a broadcast server; determining if access information for accessing ESG information corresponding to text information required for configuring a scene is included in a text element of the acquired SVGT content when the SVGT content is acquired; extracting target ESG information from a storage area, which pre-stores the ESG information, based on the access information; and outputting a LASeR scene for displaying the extracted ESG information using the SVGT content.

In accordance with an aspect of the exemplary embodiments of the present invention, there is provided a DVB-H system for providing a broadcast image using LASeR content that includes a broadcast server for generating a LASeR binary stream including access information for accessing ESG information corresponding to text information required for configuring a scene from SVGT content and transmitting the LASeR binary stream; and a DVB-H terminal for receiving and decoding the LASeR binary stream received from the broadcast server, determining if the access information for accessing the ESG information corresponding to the text information required for configuring the scene is included in a text element of the acquired SVGT content when the SVGT content is acquired as a result of decoding, extracting target ESG information from a storage area, which pre-stores the ESG information, on a basis of the access information, and outputting a LASeR scene for displaying the extracted ESG information using the SVGT content.

In accordance with an aspect of the exemplary embodiments of the present invention, there is provided a terminal for providing a broadcast image using LASeR content that includes a receiver for receiving a LASeR binary stream from a broadcast server; a LASeR decoder for acquiring SVGT content by receiving and decoding the LASeR binary stream from the receiver, and extracting target ESG information from a storage area, which pre-stores the ESG information, on a basis of access information when the access information for accessing ESG information corresponding to text information required for configuring a scene is inserted into a text element of the acquired SVGT content in an Xlink form; and an image output unit for outputting a LASeR scene for displaying the extracted ESG information using the SVGT content.

In accordance with an aspect of the exemplary embodiments of the present invention, there is provided a terminal for providing a broadcast image using LASeR content that includes a receiver for receiving a LASeR binary stream from a broadcast server; a LASeR decoder for acquiring SVGT content by receiving and decoding the LASeR binary stream from the receiver; a LASeR preprocessor for extracting target ESG information from a storage area, which pre-stores the ESG information, on a basis of a location when an ESG reference part indicating the location of the target ESG information corresponding to text information required for configuring a scene is inserted into a text element of the acquired SVGT content in a text form, and replacing the ESG reference part with the extracted ESG information; and an image output unit for outputting a LASeR scene for displaying the extracted ESG information using the SVGT content.

BRIEF DESCRIPTION OF THE DRAWINGS

The above and other features and advantages of the present invention will be more apparent from the following detailed description taken in conjunction with the accompanying drawings, in which:

FIG. 4 illustrates a structure of text elements in which Xlink attributes are defined in accordance with an exemplary embodiment of the present invention.

DETAILED DESCRIPTION OF EXEMPLARY EMBODIMENTS

Figure 1:
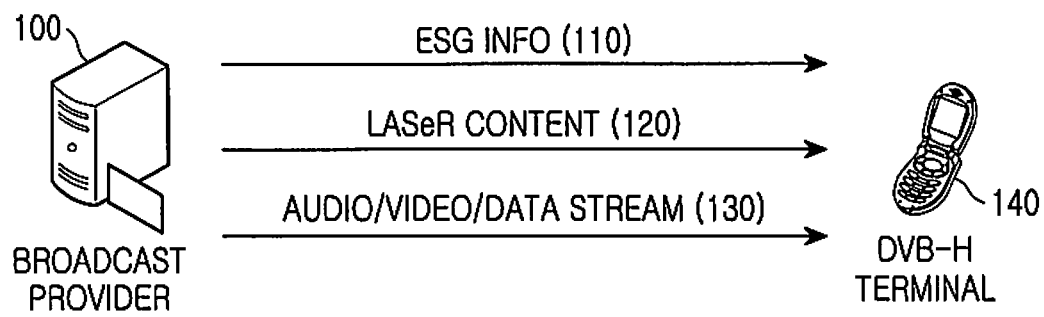
FIG. 1 illustrates a structure of a Digital Video Broadcasting-Handheld (DVB-H) system for controlling a broadcast image in accordance with an exemplary embodiment of the present invention.

Exemplary embodiments of the present invention will be described in detail herein below with reference to the accompanying drawings. In the drawings, the same or similar elements are denoted by the same reference numerals even though they are depicted in different drawings. Descriptions of well-known functions and constructions are omitted for clarity and conciseness.

The subject matter of the present invention relates to a terminal that can acquire information required for an image configuration by accessing actual Electronic Service Guide (ESG) information using linking information when broadcast provider transmits Lightweight Application Scene Representation (LASeR) content including the linking information related to the LASeR content and the ESG information provided in a Digital Video Broadcasting-Handheld (DVB-H) Convergence of Broadcast and Mobile Services (CBMS), Open Mobile Alliance Broadcasting (OMA-BCAST) or Open Air Interface (OAI) standard. The broadcast providers can directly control the configuration of the broadcast image to be displayed on the terminal, such that differentiated broadcast images can be provided on a broadcast provider-by-broadcast provider basis.

First, a DVB-H system to which the present invention is applied will be described with reference to FIG. 1. FIG. 1 illustrates a structure of the DVB-H system for controlling a broadcast image in accordance with an exemplary embodiment of the present invention.

A broadcast provider 100 provides DVB-H services by converting and broadcasting various broadcast content in a DVB-H standard. Herein, the broadcast provider 100 is a broadcast server. Conventionally, the broadcast provider 100 broadcasts ESG information 110 including information regarding the type of the broadcast service to be provided and information required to receive the broadcast service, for example, an Internet protocol (IP) address and pay service information. Moreover, the broadcast provider 100 broadcasts in real time an audio/video/data stream 130 corresponding to actual broadcast data. In particular, the broadcast provider 100 to which the present invention is applied can transmit LASeR content 120 for controlling the configuration of the broadcast image in a stream form as two streams, that is, an ESG stream and an audio/video/data stream used in a conventional DVB-H reception environment. When the LASeR stream is transmitted as one service, content written with Scalable Vector Graphics Tiny (SVGT) grammar for defining a broadcast image configuration through the LASeR stream can be binary-encoded and transmitted. The broadcast provider 100 includes linking information related to ESG information when the LASeR content 120 is configured in accordance with an exemplary embodiment of the present invention.

The linking information is used to integrate a LASeR standard and a DVB-H CBMS, OMA-BCAST or OAI standard. The linking information indicates ESG information linked to each scene. For example, when a sports-related broadcast image is constructed with multimedia objects such as graphics, events, and the like, on the basis of the LASeR content 120, the linking information corresponds to address information indicating a part of the ESG information pre-stored in a storage area from which guide information such as a sports name, a sports broadcast time, and the like to be displayed on a broadcast image is retrieved.

A DVB-H terminal 140 receives in the LASeR stream the binary-encoded content written with the SVGT grammar. When receiving and decoding the SVGT content, the DVB-H terminal 140 is able to actually configure a broadcast image.

The LASeR standard will be briefly described before the description of a method for transmitting linking information in a LASeR stream.

Conventionally, the LASeR standard defines a scheme for receiving and decoding the LASeR content. The LASeR standard describes how to actually configure multimedia objects such as graphics, events, and the like, including video/audio content and the relationship between objects and user inputs.

However, the SVGT standard included in the LASeR standard does not describe a method for accessing fields within ESG fragments transmitted in an ESG session. For example, fields of fragments such as an ESG schedule event fragment, a service fragment, and the like, should be accessible to display names of all programs capable of being watched through an arbitrary service channel.

The SVGT grammar should use text elements to display text information of a service name and the like. Thus, exemplary embodiments of the present invention propose a method for defining linking information to access ESG information within text elements based on the SVGT standard.

In exemplary embodiments of the present invention, linking information for accessing ESG information in LASeR content, specifically, SVGT content, are defined by the following two schemes. The first scheme is a scheme for changing the SVGT standard. The first scheme additionally defines an attribute or element indicating the presence of linking information for accessing ESG information in a schema of SVGT text elements. The first scheme defines additional attributes or elements for all parts requiring ESG information in the SVGT standard and enables the DVB-H terminal to extract target ESG information on the basis of the defined attributes or elements.

The second scheme directly inserts into SVGT content linking information for accessing ESG information without changing the SVGT standard. A preprocessor additionally provided in the DVB-H terminal preprocesses the linking information for accessing ESG information and then outputs the SVGT content.

Figure 2A:
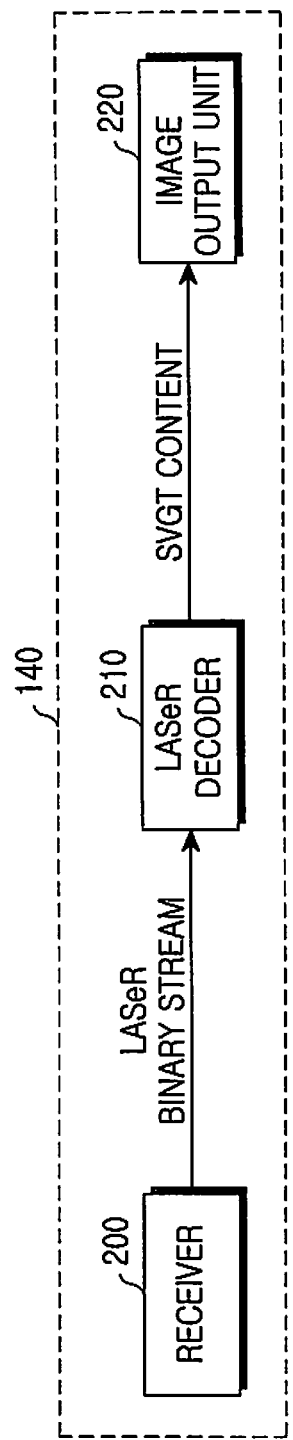
FIG. 2A is a block diagram illustrating an internal structure of a DVB-H terminal in accordance with an exemplary embodiment of the present invention.
Figure 2B:
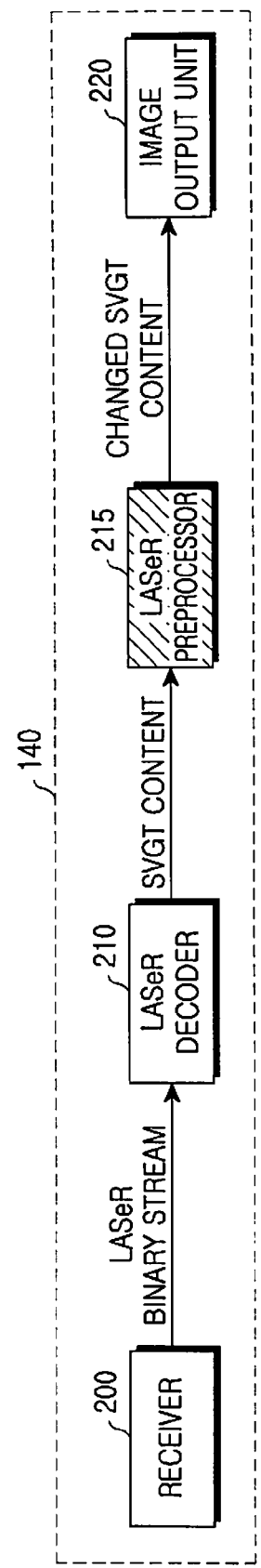
FIG. 2B is a block diagram illustrating an internal structure of a DVB-H terminal in accordance with another exemplary embodiment of the present invention.

Next, an operation for acquiring information required for an image configuration in the DVB-H terminal by accessing ESG information using linking information of SVGT content will be described with reference to FIGS. 2A and 2B. FIG. 2A is a block diagram illustrating an internal structure of the DVB-H terminal in accordance with an exemplary embodiment of the present invention, and FIG. 2B is a block diagram illustrating an internal structure of the DVB-H terminal in accordance with another exemplary embodiment of the present invention.

Referring to FIG. 2A, a DVB-H reception terminal 140 for acquiring image configuration information can be provided with a receiver 200, a LASeR decoder 210, and an image output unit 220.

The receiver 200 receives a LASeR binary stream. The LASeR binary stream is acquired by encoding SVGT content for a scene. The LASeR binary stream can be constructed with a LASeR scene description elementary stream and other elementary streams for configuring a LASeR scene (for example, including a video, audio, image or metadata elementary stream).

This LASeR binary stream is output to the LASeR decoder 210. The LASeR decoder 210 receives and decodes the LASeR binary stream. The LASeR decoder 210 acquires SVGT content by changing the binary stream to a text form in a decoding process. In accordance with an exemplary embodiment of the present invention, the SVGT content is a result obtained by adding an attribute indicating the associated ESG information to an SVGT text element. When an attribute is added, text information to be displayed on an image is fetched from a storage area storing the ESG information. For example, target ESG information is extracted from the storage area such that the actual ESG information can be displayed on a part for displaying broadcast information other than video, audio, image and font elements.

When SVGT content linked to the ESG information is output to the image output unit 220, the image output unit 220 can provide the user with a LASeR service image based on the ESG information. In accordance with the exemplary embodiment of the present invention in which the SVGT standard is changed as described above, linking information is inserted into SVGT content such that the associated ESG information can be displayed on all parts requiring broadcast information. Thus the DVB-H terminal 140 can provide various images on the basis of the ESG information, and also the broadcast service providers can provide image configurations according to their intentions.

The structure of the DVB-H terminal 140 for acquiring image configuration information in accordance with the other embodiment of the present invention will be described with reference to FIG. 2B. In accordance with the other embodiment of the present invention, the DVB-H terminal 140 can be provided with a LASeR preprocessor 215 as well as the components of FIG. 2A.

The receiver 200 receives a LASeR binary stream and then outputs the received LASeR binary stream to a LASeR decoder 210. The LASeR decoder 210 decodes the LASeR binary stream. When SVGT content is acquired in a decoding process, the LASeR decoder 210 outputs the SVGT content to the LASeR preprocessor 215. In the other exemplary embodiment of the present invention, content indicating ESG information is directly inserted into the SVGT content without changing the SVGT standard. The SVGT content is not immediately displayed, but is output to the image output unit 220 after passing through the LASeR preprocessor 215. The operation of the LASeR preprocessor 215 is as follows. When the SVGT content is output in the form of an image, a part indicating the associated ESG information within the SVGT content is output. Thus, the LASeR preprocessor 215 extracts actual ESG information from the location of a storage area mapped to the part indicating the ESG information in order to change the part indicating the ESG information, that is, an ESG reference part, to the actual ESG information. The extracted ESG information is inserted in place of the ESG reference part. When the SVGT content changed in the preprocessing operation is output to the image output unit 220, the image output unit 220 outputs a LASeR service image as an associated scene configuration along with the ESG information.

Figure 3:
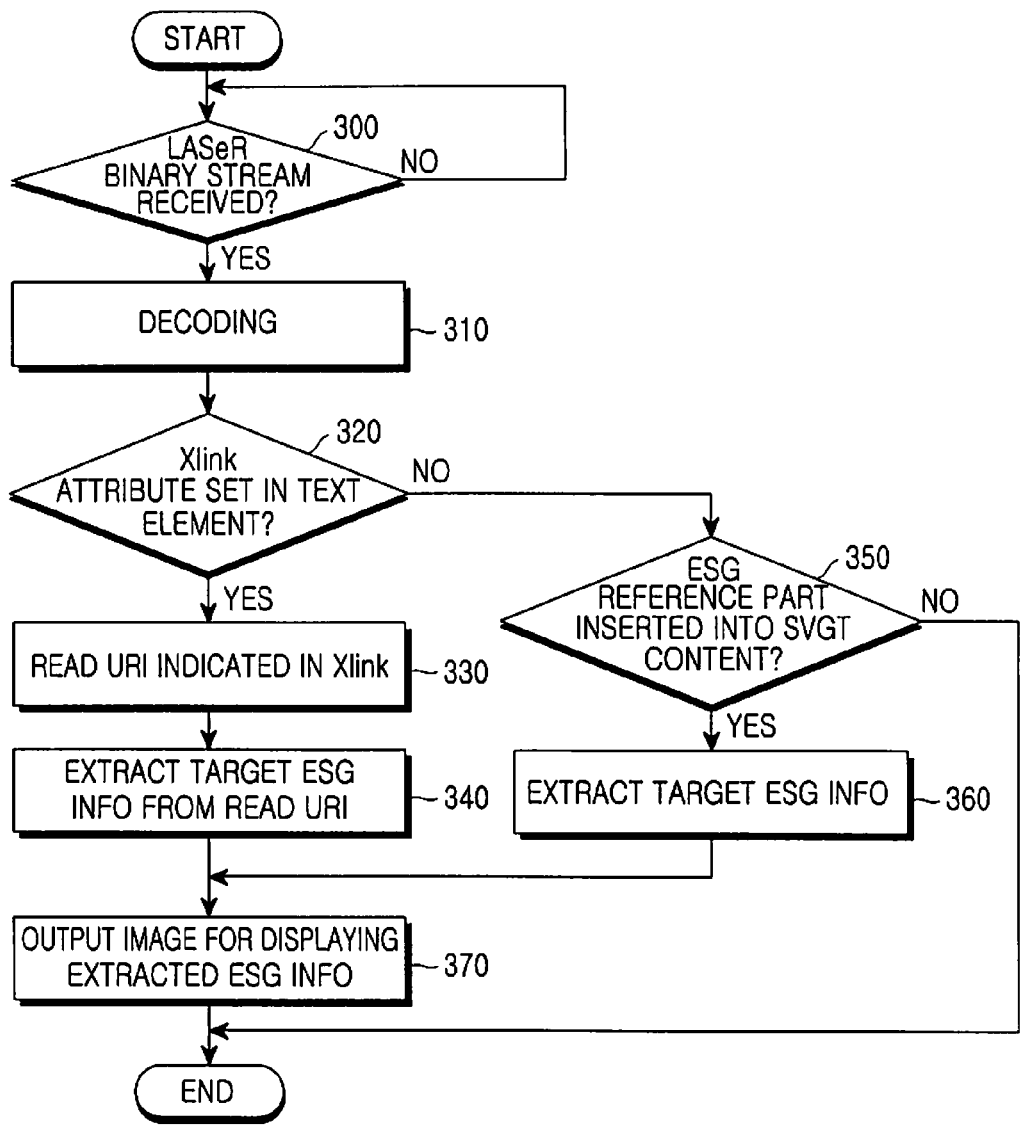
FIG. 3 is a flowchart illustrating a process for acquiring Scalable Vector Graphics Tiny (SVGT) content into which Electronic Service Guide (ESG) information is inserted in accordance with an exemplary embodiment of the present invention.

FIG. 3 is a flowchart illustrating a process for acquiring SVGT content into which ESG information is inserted in accordance with an exemplary embodiment of the present invention. FIG. 3 illustrates the SVGT content acquisition process in the DVB-H terminal considering both the case where the SVGT standard changes in accordance with one exemplary embodiment of the present invention and the case where the SVGT standard does not change in accordance with the other exemplary embodiment of the present invention.

First, the terminal determines if a LASeR binary stream is received from a broadcast provider via a communication network in step 300. Upon determining that the LASeR binary stream is received, the terminal acquires SVGT content by decoding the received LASeR binary stream in step 310. Then, the terminal proceeds to step 320 to determine if an Xlink attribute is set in a text element within the SVGT content. That is, when the SVGT content is acquired, a determination is made as to whether the Xlink attribute corresponding to access information for accessing ESG information corresponding to text information required for configuring a scene is included in text elements of the acquired SVGT content. The text elements are used to display an image of text broadcast information of a service name and the like. A structure of the text elements is the same as illustrated in FIG. 4. When the Xlink attribute is defined in the text elements, the Xlink attribute as indicated by reference numeral 400 can be additionally defined in the text elements. That is, reference number 400 indicates that a Uniform Resource Identifier (URI) linked by the Xlink is present in a text element with actual text information.

If the Xlink attribute is set in the SVGT content, it means that the SVGT standard is changed in accordance with the exemplary embodiment of the present invention. When an attribute for enabling access to an arbitrary object is added to a text element within the SVGT content, interface with the SVGT content and the ESG information is possible. In particular, in an exemplary embodiment of the present invention, the Xlink attribute is additionally defined in a text element for enabling access to an arbitrary object. When the Xlink is defined, access to the ESG information in the SVGT content is possible in an exemplary embodiment of the present invention.

When the Xlink attribute is set in the SVGT content, the terminal proceeds to step 330 to read a URI indicated in the Xlink. That is, the associated URI is read from the Xlink indicating the location of the ESG information. Then the terminal extracts the target ESG information from the read URI in step 340. The Xlink attribute part within a text element is as follows. An example of the Xlink attribute has a URI form as shown in Example (1).

Example (1)

ESGProviderID/ESGFragmentType/ESGFragmentID/FieldName

Example (1) shows a URI constructed with a name of a broadcast provider for providing ESG information, an ESG fragment type, an ESG fragment ID and a field name included in a fragment. The URI indicates an address at which actual ESG information is retrieved from a storage area storing the ESG information. The above-described Xlink attribute is inserted into the SVGT content in each part requiring ESG information in each scene. An example of this text element is shown in Example (2).

Example (2)

<Text x="100"y="20"Xlink:href="ESGProviderID_1/ServiceFragment/11/ServiceNa me"></Text>

Example (2) is an example in which a ServiceName field included in a service fragment whose ID is "11," is extracted from ESG information provided by an ESG provider whose ID is "ESGProvider ID_1" and is used.

When the target ESG information is extracted for each part requiring ESG information through the above-described process, the terminal proceeds to step 370 to output an image for displaying the extracted ESG information.

Upon determining in step 320 that the Xlink attribute is not set in a text element, the terminal detects that the SVGT standard has not changed and then proceeds to step 350. If the SVGT standard has not changed in accordance with the other exemplary embodiment of the present invention, the SVGT content into which ESG information is directly inserted can be received. To provide the associated ESG information to a part requiring the ESG information in each scene without changing the SVGT standard, content indicating a specific field of an ESG fragment, that is, an ESG reference part, can be directly inserted into a text element of the SVGT content in the form of text in accordance with the other exemplary embodiment of the present invention.

Thus, the terminal determines in step 350 if the ESG reference part is inserted into the SVGT content. When acquiring the SVGT content, the terminal determines if access information for accessing ESG information corresponding to text information required for configuring a scene is included in a text element of the acquired SVGT content scene in the form of text. Upon determining that an ESG reference part is inserted, the terminal extracts the associated ESG information with which the ESG reference part is replaced through a preprocessing operation of the LASeR preprocessor 215 in step 360. This ESG information can be extracted by accessing a URI mapped to the ESG reference part. An example of this ESG reference part can be defined as shown in Example (3).

Example (3)

ESG://ESGProviderID/ESGFragmentType/ESGFragmentID/FieldName

In Example (3), ESGFragmentType and FieldName can use a fragment name defined in the existing DVB-H CBMS and a field name defined in each fragment, and ESGProviderID and ESGFragmentID can use ID values allocated to an actual ESG provider and an ESG fragment.

Figure 5:
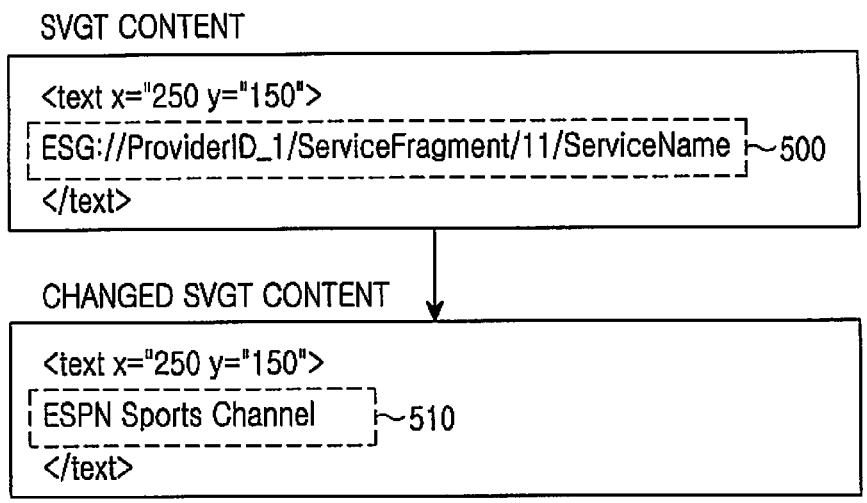
FIG. 5 illustrates an example in which an ESG reference part within SVGT content is changed in accordance with an exemplary embodiment of the present invention.

Through the above-described process, an ESG reference part of SVGT content as indicated by reference numeral 500 of FIG. 5 is changed to extracted ESG information to be actually used as indicated by reference numeral 510 of FIG. 5. Thus, the terminal detects how to configure an actual image on the basis of SVGT content and outputs an image for displaying ESG information in step 370.

As described above, the present invention provides a method in which a broadcast provider can directly control a configuration of an image to be displayed on a terminal by integrating a LASeR standard and a DVB-H CBMS standard under a DVB-H reception environment. Thus, the broadcast provider enables all terminals to equally display content of the broadcast provider, thereby providing a service differentiated from those of other service providers. Moreover, the present invention provides both a method based on a changed standard and a method based on an existing standard. Not only can an image be configured according to intention of the service provider, irrespective of a terminal manufacturer and a terminal type, but also various images can be provided according to types and characteristics of content.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for providing a broadcast image using Lightweight Application Scene Representation (LASeR) content in a Digital Video Broadcasting-Handheld (DVB-H) terminal, comprising:

acquiring Scalable Vector Graphics Tiny (SVGT) content by decoding a LASeR binary stream received from a broadcast server;

determining if access information for accessing Electronic Service Guide (ESG) information required for configuring a scene is included in the acquired SVGT content;

extracting, on a basis of the access information, target ESG information from a storage area in which the ESG information is pre-stored; and outputting a LASeR scene for displaying the extracted ESG information using the SVGT content.

2. The method of claim 1, wherein the determining step comprises:

determining if an Xlink attribute is inserted into a text element within the acquired SVGT content; and reading from the storage area an address indicating a location at which the target ESG information is stored with respect to each part into which the Xlink attribute is inserted when there is the inserted Xlink attribute.

3. The method of claim 2, wherein the address is a Uniform Resource Identifier (URI) that includes a name of a broadcast provider for providing the ESG information, an ESG fragment type, an ESG fragment identifier, and a field name included in a fragment.

4. The method of claim 1, wherein the access information for accessing the ESG information is an ESG reference part in the form of text contained in a text element of the acquired SVGT content.

5. The method of claim 4, wherein the step of outputting the LASeR scene for displaying the extracted ESG information comprises:

changing the ESG reference part to the extracted ESG information; and outputting the LASeR scene using the SVGT content including the extracted ESG information.

6. A Digital Video Broadcasting-Handheld (DVB-H) system for providing a broadcast image using Lightweight Application Scene Representation (LASeR) content, comprising:

a broadcast server for generating a LASeR binary stream including access information for accessing Electronic Service Guide (ESG) information corresponding to text information required for configuring a scene from Scalable Vector Graphics Tiny (SVGT) content and transmitting the LASeR binary stream; and a DVB-H terminal for receiving and decoding the LASeR binary stream received from the broadcast server, determining if the access information for accessing the ESG information required for configuring the scene is included in the acquired SVGT content as a result of decoding, extracting, on a basis of the access information, target ESG information from a storage area in which the ESG information is pre-stored, and outputting a LASeR scene for displaying the extracted ESG information using the SVGT content.

7. A terminal for providing a broadcast image using Lightweight Application Scene Representation (LASeR) content, comprising:

a receiver for receiving a LASeR binary stream from a broadcast server;

a LASeR decoder for acquiring Scalable Vector Graphics Tiny (SVGT) content by receiving and decoding the LASeR binary stream from the receiver, and extracting on a basis of access information target Electronic Service Guide (ESG) information from a storage area that pre-stores the ESG information when the access information for accessing ESG information corresponding to text information required for configuring a scene is inserted into a text element of the acquired SVGT content in an Xlink form; and an image output unit for outputting a LASeR scene for displaying the extracted ESG information using the SVGT content.

8. The terminal of claim 7, wherein the access information is a Uniform Resource Identifier (URI) that includes the name of a broadcast provider for providing the ESG information, an ESG fragment type, an ESG fragment identifier, and a field name included in a fragment.

9. A terminal for providing a broadcast image using Lightweight Application Scene Representation (LASeR) content, comprising:

a receiver for receiving a LASeR binary stream from a broadcast server;

a LASeR decoder for acquiring Scalable Vector Graphics Tiny (SVGT) content by receiving and decoding the LASeR binary stream from the receiver;

a LASeR preprocessor for extracting on a basis of a location target Electronic Service Guide (ESG) information from a storage area that pre-stores the ESG information when an ESG reference part indicating the location of the target ESG information corresponding to text information required for configuring a scene is inserted into a text element of the acquired SVGT content in a text form, and replacing the ESG reference part with the extracted ESG information; and an image output unit for outputting a LASeR scene for displaying the extracted ESG information using the SVGT content.

10. The terminal of claim 9, wherein information regarding the location includes a name of a broadcast provider for providing the ESG information, an ESG fragment type, an ESG fragment identifier, and a field name included in a fragment.

* * * * *